US006087889A

United States Patent [19]

Mok

[11] Patent Number: 6,087,889

[45] Date of Patent: Jul. 11, 2000

[54] FUSE CIRCUIT FOR A SEMICONDUCTOR DEVICE

[75] Inventor: Do-Sang Mok, Seoul, Rep. of Korea

[73] Assignee: Samsung Electronics, Co., Ltd., Suwon, Rep. of Korea

[21] Appl. No.: 08/731,446

[22] Filed: Oct. 15, 1996

[30] Foreign Application Priority Data

Oct. 13, 1996 [KR] Rep. of Korea ...................... 95-35245

[51] Int. Cl.[7] ........................................................ H02H 7/20

[52] U.S. Cl. ................................ 327/525; 327/51; 326/38

[58] Field of Search ..................................... 327/525, 526; 365/96, 225.7; 326/38

[56] References Cited

U.S. PATENT DOCUMENTS

| | | | |
|---|---|---|---|
| 4,223,277 | 9/1980 | Taylor et al. | 327/525 |
| 5,345,110 | 9/1994 | Renfro et al. | 327/525 |
| 5,404,049 | 4/1995 | Canada et al. | 327/525 |
| 5,420,456 | 5/1995 | Galbi et al. | 327/525 |
| 5,731,760 | 3/1998 | Ramirez | 327/525 |

*Primary Examiner*—Timothy P. Callahan
*Assistant Examiner*—Hiep Nguyen
*Attorney, Agent, or Firm*—Marger Johnson & McCollom, P.C.

[57] ABSTRACT

A fuse circuit for a semiconductor device allows the device to be adjusted after fabrication by selectively blowing a fuse in response to a fuse control signal. The circuit is fabricated on the semiconductor device and includes a fuse, an enable circuit for blowing the fuse in response to the fuse control signal, and a sensing circuit for sensing the state of the fuse. A comparison signal generator can be coupled to the fuse to generate two comparison signals that are compared by a differential comparator which generates an output signal indicative of the state of the fuse. The comparison signal generator is coupled to the fuse and includes a resistive voltage divider which generates the comparison signals by dividing a power supply voltage signal. If the fuse is blown, the first comparison signal is at a higher voltage level than the second comparison signal, and a comparator in the sensing circuit generates an output signal having a low logic level to indicate that the fuse is blown. If the fuse is not blown, the first comparison signal is at a lower voltage level than the second comparison signal, and the comparator generates an output signal having a high logic level to indicate that the fuse is not blown. A detector circuit which includes a voltage sensing resistor can be coupled between the comparison signal generator and the fuse to allow the circuit to detect a blown fuse which is not completely blown, but has a high enough resistance to be considered blown.

18 Claims, 2 Drawing Sheets

FUSE CIRCUIT FOR A SEMICONDUCTOR DEVICE

This application corresponds to Korean Patent Application No. 95-35245 field Oct. 13, 1996, in the name of Samsung Electronics Co., Ltd., which is herein incorporated by reference.

BACKGROUND OF THE INVENTION

1. Field of the Invention

The present invention relates to fuse circuits for semiconductor devices, and more particularly to fuse circuits used during the fabrication of semiconductor integrated circuits.

2. Description of the Related Art

Several semiconductor integrated circuits may have different electrical characteristics even though they were fabricated using the same fabrication method. This is because it is difficult to continuously maintain uniform conditions during the fabrication of each integrated circuit. Thus, integrated circuits (hereinafter, referred to as "IC"s) fabricated with a particular process have electrical characteristics which deviate from, and are distributed around, a designed target level of electrical characteristics.

The electrical characteristics of many products in which such IC's are used call for a very limited range of electrical characteristics. For example, FM (frequency modulation) carrier & deviation must be managed in an extremely limited range during the fabrication of many products. In an NTSC image signal processing IC for VHS video system, it is clearly stated in the VHS specification for a VCR (video cassette recorder) that, when an image signal of 0.5 Vpp utilizing a brightness signal as a standard signal is provided to an FM circuit, the FM circuit must output a frequency signal having a sync tip level of 3.4 MHz±0.1 MHz and a white peak of 4.4 MHz±0.1 MHz (i.e., frequency deviation of 1.0 MHz±0.1 MHz) with respect to the image signal provide. Even though IC's are designed with an accurate targeted level of electric characteristics, the fabricated IC's often fail to meet the target specifications.

A conventional technique for making a product meet a target specification involves using a variable resistor located outside an IC which is adjusted by the manufacturer of a product which uses the IC so as to control FM carrier & deviation and to provide a specific FM signal. A problem with this technique however, is that it increases the time and cost of manufacturing electric products such as VCRs.

Another conventional technique for adjusting the FM carrier & deviation of an IC involves cutting a fuse between both ends of a pad during the fabrication of an IC. However, even though the FM carrier & deviation are accurately adjusted during the fabrication of an IC, the electrical characteristics may change again during the following process steps after the adjustment thereof. As a result, a specific FM value still cannot be obtained in a fully assembled IC.

Accordingly, a need remains for a technique for adjusting an IC which overcomes the problems discussed above.

SUMMARY OF THE INVENTION

It is therefore an object of the present invention to provide a method and apparatus for accurately adjusting the electrical characteristics of an integrated circuit after the fabrication of the IC.

It is another object of the present invention to provide a method and apparatus for improving the reliability of a fuse circuit.

It is a further object of the present invention to provide a method and technique for adjusting the electrical characteristics of a semiconductor integrated circuit which do not require any adjustment operations by a manufacture building the IC into an end product.

To achieve these and other objects, the applicant has invented a fuse circuit for a semiconductor device which allows the device to be adjusted after fabrication by selectively blowing a fuse in response to a fuse control signal. The circuit is fabricated on the semiconductor device and includes a fuse, an enable circuit for blowing the fuse in response to the fuse control signal, and a sensing circuit for sensing the state of the fuse.

One aspect of the present invention is a semiconductor device comprising: a fuse; an enabling circuit coupled to the fuse, the enabling circuit blowing the fuse responsive to a fuse control signal; and a sensing circuit coupled to the fuse, the sensing circuit generating an output signal responsive to the state of the fuse. The device can also include a comparison signal generator coupled to the fuse and the sensing circuit to generate a comparison signal responsive to the state of the fuse. The comparison signal generator includes a voltage divider coupled to the fuse, the voltage divider dividing a power supply signal into a first comparison signal and a second comparison signal, and the sensing circuit includes a comparator coupled to the voltage divider. The fuse is coupled between a mode setting terminal and a first node, the voltage divider includes a first resistor coupled between the first node and a second node, and a second resistor coupled between the second node and a power supply terminal, and the comparator includes a first input terminal coupled to the first node, a second input terminal coupled to the second node, and an output terminal for generating the output signal.

Another aspect of the present invention is a method of adjusting a semiconductor device after fabrication comprising: generating a fuse control signal; blowing a fuse responsive to the fuse control signal if the fuse control signal is asserted; and generating an output signal responsive to the state of the fuse. Generating the output signal includes: sensing the resistance of the fuse; and asserting the output signal if the resistance of the fuse exceeds a predetermined value.

An advantage of the present invention is that it allows a semiconductor device to be adjusted after fabrication, thereby improving the accuracy of the adjustment and reducing the time and cost required to build the device into an end product.

A further advantage of the present invention is that it provides a technique for adjusting a semiconductor device without having to completely blow a fuse, thereby further reducing the time and cost required to build the device into an end product.

The foregoing and other objects, features and advantages of the invention will become more readily apparent from the following detailed description of a preferred embodiment of the invention which proceeds with reference to the accompanying drawings.

DETAILED DESCRIPTION

Figure 1:
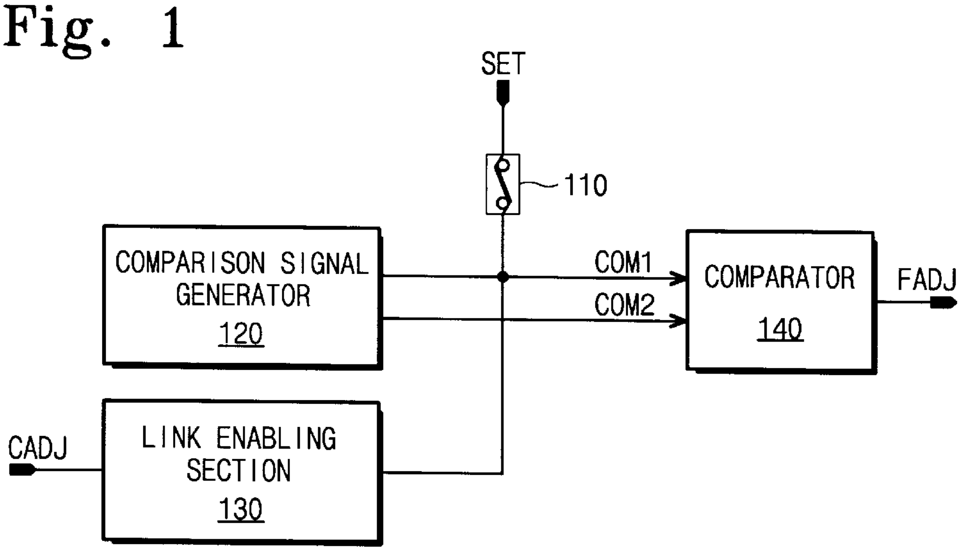
FIG. 1 is a block diagram of an embodiment of a semiconductor fuse circuit in accordance with the present invention.

FIG. 1 is a block diagram of an embodiment of a semiconductor fuse circuit in accordance with the present invention. Referring to FIG. 1, a fuse circuit in accordance with the present invention includes a fusible link (referred to herein as a fuse) 110, a comparison signal generator 120 for generating first and second comparison signals COM1 and COM2 in response to a bias voltage and the state of the fuse, a link enabling section (referred to herein as an enable circuit) 130 for enabling the fuse 110 to be blown in response to a fuse control signal CADJ which is an input of the fuse circuit, and a sensing circuit which, in the embodiment of FIG. 1 includes a comparator 140 for generating an output signal indicative of the state of the fuse 110 in accordance with the comparison result of the first and the second comparison signals from the generator 120.

If the fuse 110 is blown by the enable circuit 130 which receives the fuse control signal CADJ, the voltage level of the first comparison signal COM1 becomes higher than that of the second comparison signal COM2. Then, the comparator 140 compares the first and the second comparison signals with each other and generates a signal FADJ which has a low level indicating that the fuse 110 is blown. If, however, the fuse 110 is not blown, the voltage level of the first comparison signal COM1 becomes lower than that of the second comparison signal COM2. The comparator 140 then generates a signal FADJ having a high level indicating that the fuse 110 is not blown.

Figure 2:
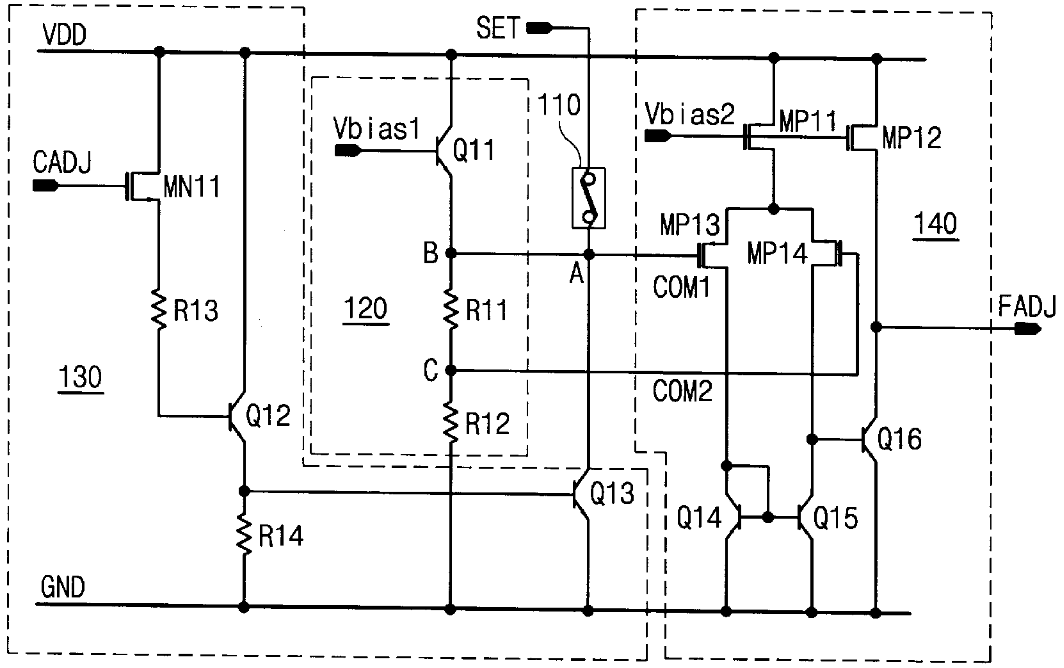
FIG. 2 is a schematic diagram showing more detail of the circuit of FIG. 1.

As shown in FIG. 2, the comparison signal generator 120 includes a voltage divider comprising two resistors R11 and R12 connected in series between a node "B" and a ground terminal GND, and an NPN transistor Q11 for providing a power source voltage VDD to a node "B" to energize the voltage divider in response to a bias voltage signal Vbias1. The first comparison signal COM1 is generated from the node "B" and the second comparison signal COM2 from a node "C" between the two resistors R11 and R12. The voltage level of the first comparison signal COM1 is adjusted in accordance with the state of the fuse 110.

The enable circuit 130 has an NMOS transistor MN11, two bias resistors R13 and R14 and two NPN transistors Q12 and Q13. The NMOS transistor MN11 is activated in response to the fuse control signal CADJ, so that the source voltage VDD may be provided through the bias resistor R13 to the base of transistor Q12. Transistor Q12 is activated in response to a bias voltage applied through the resistor R13 to allow for the delivery of the source voltage VDD to the bias resistor R14 and the base of transistor Q13. The fuse 110 is connected between the collector of transistor Q13 and a mode setting terminal SET.

The comparator 140 has a first circuit section for comparing the two comparison signals COM1 and COM2 from the nodes "B" and "C" and generating a first output signal which has a high voltage level if the first comparison signal COM1 is higher in voltage level than the second comparison signal COM2. The first output signal has a low voltage level if the first comparison signal COM1 is lower in voltage level than the second comparison signal COM2. The comparator also includes a second circuit section for generating a signal FADJ indicating whether or not the fuse is blown in response to the first and the second output signals of the first circuit section. The first circuit section has, as shown in FIG. 2, three PMOS transistors, one of which is a PMOS transistor MP11 which is activated by a bias voltage Vbias2 applied to the gate thereof. The other PMOS transistors MP13 and MP14 are activated by the first and second comparison signals COM1 and COM2 from the nodes "B" and "C", respectively. The transistors MP13 and MP14 compare the first and the second comparison signals COM1 and COM2, respectively, applied to the gates thereof, and generate the first and the second output signals from the respective drains thereof.

The second circuit section has a PMOS transistor MP12 and three NPN transistors Q14, Q15 and Q16. The transistor MP12 is activated by the bias voltage Vbias2 applied to the gate thereof to permit the delivery of the source voltage VDD from source to drain. The signal on the drain of the transistor MP12 is provided to the output terminal FADJ of the comparator 140. The transistor Q16 is part of an output stage of the comparator 140 and is activated in response to the second output signal from the drain of the transistor MP14 to pull the output FADJ of the comparator 140 to ground. If NPN transistors Q14 and Q15 are simultaneously activated by the first output signal commonly applied to the bases thereof, the first and the second output signals flow through the activated transistors Q14 and Q15 to ground GND, respectively. If the transistor Q15 is activated, the transistor Q16 is deactivated because the second output signal is at the ground level.

Fuse 110 is fabricated from a material normally used for the fabrication of semiconductor IC's such as a layer of metal or polysilicon on a semiconductor substrate. A zener zap diode can be used in place of fuse 110.

The operation of the fuse circuit will now be described in more detail with reference to FIG. 2. The operation of the fuse circuit can be broadly classified into two modes, one of which is a fuse blowing mode and the other of which is a normal mode.

During the normal mode, a low level signal is applied to the mode setting terminal SET. If the fuse 110 is not blown, it appears as a short-circuit since it has a resistance of no more than several ohms. If the transistor Q11 then is activated by a bias voltage Vbias1, the voltage level on node "C" becomes higher than that on node "A" because the node "A" is electrically connected through the short-circuited fuse 110 to the mode setting terminal SET which is at ground level. Thus, the comparison signals COM1 and COM2 are at low and high levels, respectively. The PMOS transistors MP11 and MP12 in the comparator 140 are then simultaneously activated by the bias voltage Vbias2 which is applied to the gates thereof, and the PMOS transistor MP13 is activated by the comparison signal COM1 on the node "B" or "A", so that the NPN transistors Q14 and Q15 are be activated and the NPN transistor is Q16 deactivated. As a result, a high level signal, which indicates the non-blown state of the fuse 110 is generated at the output node FADJ.

During the fuse blowing mode, the mode setting terminal SET is driven with a signal which will cause the fuse to blow if node A is grounded. If the fuse control signal CADJ is at a low level, the NMOS transistor MN11 in the enabling circuit 130 is deactivated, as are the NPN transistors Q12 and Q13. As a result, no current flows through the fuse 110. If the fuse control signal CADJ having a high level is applied to the input node of the section 130, the transistor MN11 is saturated and thus transistor Q12 is activated, thereby driving transistor Q13 into saturation. As a result, a large amount of current instantaneously flows through fuse 110 which then causes the fuse to blow, i.e., to have an infinite resistance.

If the fuse 110 is blown, voltages VB and VC on the nodes "B" and "C" during normal operation can be obtained from the following equations:

$$VB = Vvbias - Vbeq1 \quad Eq(1A)$$

$$VC = VB - (R11 \times Icq1) \quad Eq(1B)$$

where Vvbias represents a voltage at the node Vbias1, Vbeq1 is the base-emitter voltage of the NPN transistor Q11, and Icq1 is the collector current of the transistor Q11.

From the above equations 1A and 1B, it can be seen that the voltages at nodes "B" and "C" satisfy the condition that VB is always greater than VC, i.e., VB>VC. If the fuse is blown, the voltages at nodes "B" and "C" satisfy the condition of VB–VA. Since the voltage of node "A" is greater than that on the node "C" when the fuse is blown, the first comparison signal COM1 is at a higher level than the second comparison signal COM2. Thus, transistor Q16 is activated to pull the output node FADJ down to ground so as to indicate the blown state of the fuse 110.

During the fuse blowing mode, the fuse control signal on the input node CADJ must be maintained at the high level for a long period of time to completely blow the fuse 110. However, during the fabrication of IC's, it is necessary to minimize the production time so as to reduce the product cost and strengthen the market competitiveness of the fabricated IC's. Accordingly, since it is inefficient to drive the fuse with a high current signal for a sufficient time to allow the fuse to be completely blown.

Also, If the fuse 110 is not completely blown, it may not be possible to completely blow the fuse. This is because a sufficient current signal has to continuously flow through the fuse to completely blow it. However, the crystalline structure of the fuse 110 is often destroyed due to a large amount of current flowing therethrough, and therefore the fuse has a high resistance which, in turn, prevents an adequate amount of current from flowing through the fuse. In other words, the fuse may be driven with a fuse blowing signal for a period of time which is appropriate for blowing a typical fuse, but the fuse will not have a high enough resistance to be considered blown.

Figure 3:
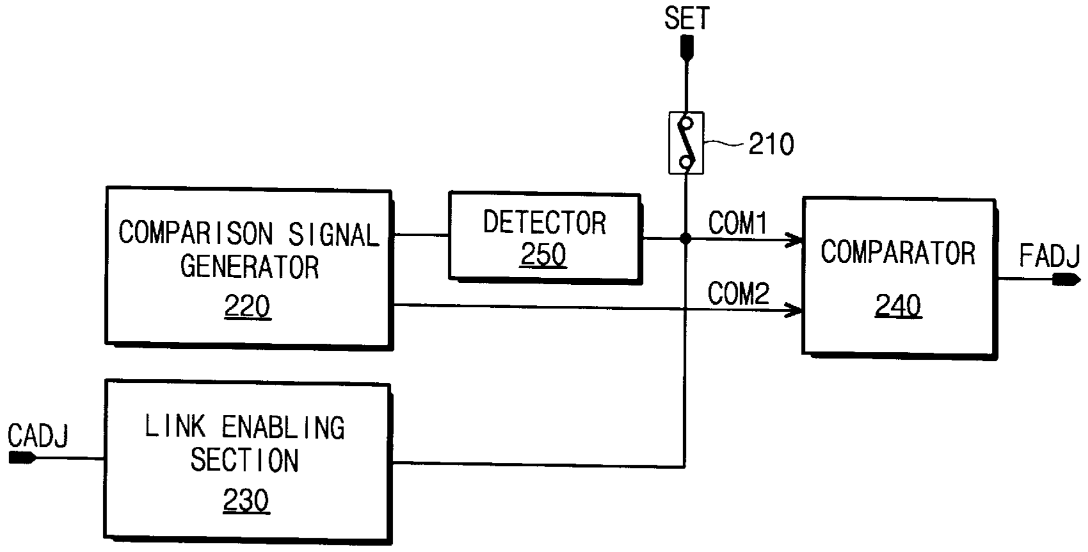
FIG. 3 is a block diagram of a second embodiment of a semiconductor fuse circuit in accordance with the present invention.

FIG. 3 is a block diagram of a second embodiment of a semiconductor fuse circuit in accordance with the present invention. The circuit of FIG. 3 includes a detector circuit for detecting a blown state of the fuse even if the fuse has not been driven with a fuse blowing signal for an appropriate period of time, or if the resistance of the fuse is has not reached a constant value.

The fuse circuit of FIG. 3 is similar in construction to that of FIG. 1, except that a detector 250 is connected between nodes "B" and "A" to detect whether, after fuse 210 is blown, the resistance of the fuse has reached an adequate value to be considered blown.

Referring to FIG. 3, a second embodiment of a fuse circuit in accordance with the present invention includes a fuse 210, a comparison signal generator 220 for dividing a power source voltage VDD into first and second comparison signals COM1 and COM2 in response to a bias voltage. The fuse circuit also includes an enable circuit 230 for enabling the fuse 210 to be blown in response to a fuse control signal CADJ which is input to the fuse circuit. A detector 250 detects whether the resistance of the fuse 210 exceeds a constant value and generates a signal indicative of the state of the fuse. A comparator 240 generates a signal indicative of the state of the fuse 210 responsive to the first and the second comparison signals from the generator 220.

Referring to FIG. 3, the detector 250 detects whether the fuse 210 is completely blown or has a resistance greater than a constant value during the blowing of the fuse. The enable circuit 230 receives a fuse control signal CADJ at an input node thereof and generates a detection signal as the first comparison signal COM1. Then, the voltage level of the first comparison signal COM 1 becomes higher than that of the second comparison signal COM2. The comparator 240 compares the first and the second comparison signals and generates a signal FADJ having a low level which indicates that the fuse 210 is blown.

Figure 4:
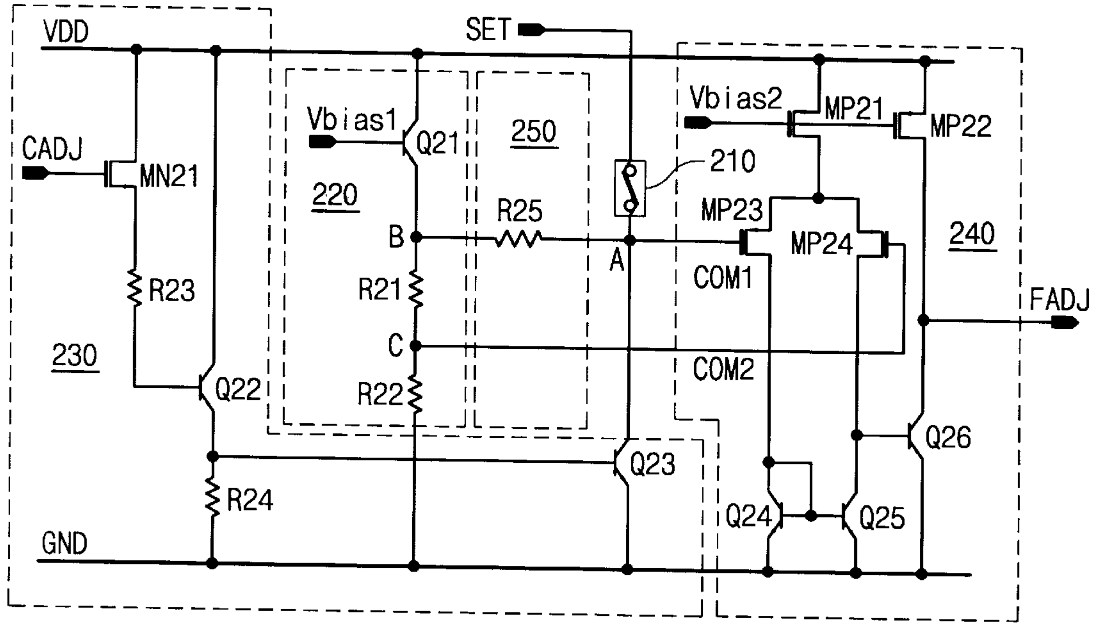
FIG. 4 is a schematic diagram showing more detail of the circuit of FIG. 3.

FIG. 4 is a schematic diagram showing more detail of the circuit of FIG. 3 As illustrated in FIG. 4, the comparison signal generator 220 has an NPN transistor Q21 for allowing for the delivery of a power source voltage VDD to a node "B" in response to a bias voltage Vbias1. A voltage divider comprising two resistors R21 and R22 is connected in series between node "B" and a ground terminal GND to divide the voltage VDD into two comparison signals. The first comparison signal COM1 is generated from the node "B" as one of the divided voltages and the second comparison signal COM2 from a node "C" between resistors R21 and R22. The detector 250 includes a resistor R25 connected between nodes "B" and "A". The resistors R21 and R22 have the same resistance, and the resistance of R25 is the same as that of fuse which is considered to be blown.

The enable circuit 230 has an NMOS transistor MN21, two bias resistors R23 and R24 and two NPN transistors Q22 and Q23. The NMOS transistor MN21 is activated in response to the fuse control signal CADJ, so that the source voltage VDD is provided through the bias resistor R23 to a base of transistor Q22. The transistor Q22 is activated in response to a bias voltage applied through the resistor R23 to couple the source voltage VDD to the bias resistor R24 and the base of transistor Q23. the fuse 210 is connected between the emitter of transistor Q23 and a mode setting terminal SET.

The comparator 240 has a first circuit section for comparing the two comparison signals COM1 and COM2 from nodes "B" and "C" and generating a first output signal if the first comparison signal COM1 is higher in voltage level than the second comparison signal COM2. The comparator 240 also has a second circuit section for generating an output signal for indicating whether or not the fuse is blown in response to the first and the second output signals of the first circuit section.

The first circuit section has, as shown in FIG. 4, three PMOS transistors, one of which is PMOS transistor MP21 which is activated by a bias voltage Vbias2 applied to the gate thereof to permit the coupling of the source voltage VDD from its source to its drain. The others PMOS transistors MP23 and MP24 are activated by the first and second comparison signals COM1 and COM2 from the nodes "B" and "C", respectively. The transistors MP23 and MP24 compare the first and the second comparison signals COM and COM2 respectively applied to the gates thereof, and generate the first and the second output signals from the respective drains thereof.

The second circuit section has a PMOS transistor MP22 and three NPN transistors Q24, Q25 and Q26. The transistor MP22 is activated by the bias voltage Vbias2 applied to the gate thereof to couple the source voltage VDD from its source to its drain. The signal on the drain of the transistor MP22 is provided to the output terminal FADJ of the comparator 240. The transistor Q26 is located in an output stage of the comparator 240 and is activated in response to the second output signal from the drain of the transistor MP24 to pull the output terminal FADJ of the comparator 240 to ground GND. If the NPN transistors Q24 and Q25 are simultaneously activated by the first output signal commonly applied to the bases thereof, the first and the second output signals flow through the activated transistors Q24 and Q25, respectively, to ground GND. If transistor Q25 is activated, transistor Q26 is inactivated because the second output signal is at ground level.

As with the first embodiment, the fuse 210 can be fabricated from a layer of metal or polysilicon fabricated on a semiconductor substrate. A zener zap diode can also be used in place of the fuse 210.

The operation of the fuse circuit of FIG. 4 will now be described in more detail. During the fuse blowing mode, the transistor MN21 in the enable circuit 230 is activated by a fuse control signal CADJ having a high level and thus transistor Q22 activated, which in turn, drives transistor Q23 into saturation. As a result, a large amount of current instantaneously flows through the fuse 210. The fuse 210 is then blown, and the crystalline structure of the fuse is destroyed, so that the resistance of the fuse exceeds a predetermined constant resistance. As a result, the voltages VA and VC on the nodes "A" and "C" may be obtained from following equations:

$$VA=VB\times RFL/(R25+RFL) \quad \text{Eq(2A)}$$

$$VC=VB\times R22/(R21+R22) \quad \text{Eq(2B)}$$

where RFL represents the equivalent resistance of the fuse 210. If the resistance of the fuse 210 is changed more than 100 kΩ when the fuse is blown, the resistor R25 is set to have a resistance of about 100 kΩ.

From the above equations 2A and 2B, it can be seen that VA is greater than or equal to VC because RFL≧R25. The voltage COM1 at the node "A" is greater than the voltage COM2 on the node "C", so that a low level signal is generated from the output terminal FADJ of the fuse circuit when the fuse 210 is completely blown.

An advantage of the additional resistor R25 is that it is increases the accuracy with which the blown state of the fuse 210 can be detected during the fuse blowing operation. A further advantage of the additional resistor is that it helps stabilize the fuse circuit. This is because the mode setting terminal SET is grounded during the normal mode. The fuse circuit of FIG. 2 may become unstable when the bias voltage signal Vbias1 is applied through the transistor Q21 and the non-blown fuse 210 is connected to the mode setting terminal SET which is grounded. Thus, the resistor R25 also prevents the fuse circuit from entering an unstable state.

Although the embodiments of the present invention discussed above illustrate a circuit for a single fuse, they can be readily adapted to a semiconductor device having a plurality of fuses. For a device having a plurality of fuse circuits, several fuse signals FADJ from the fuse circuits may be provided for controlling the operational characteristics of the device. The states of the individual fuses can be determined so as to adjust the electrical characteristics of the device after the fabrication thereof. In a semiconductor device having a plurality of fuse circuits corresponding to a plurality of fuses, a power source voltage can be selectively applied to the terminals of the circuits to act as mode setting signals for selecting a specific fuse to blow. A high logic level signal is fed to each input terminal CADJ which corresponding to a specific fuse which is to be blown so that a targeted electrical characteristics of the device can be accurately adjusted after the fabrication thereof.

Having described and illustrated the principles of the invention in a preferred embodiment thereof, it should be apparent that the invention can be modified in arrangement and detail without departing from such principles. I claim all modifications and variations coming within the spirit and scope of the following claims.

I claim:

1. A semiconductor device comprising:
- a fuse;
- an enabling circuit coupled to the fuse, the enabling circuit blowing the fuse responsive to a fuse control signal;
- a sensing circuit coupled to the fuse, the sensing circuit generating an output signal responsive to the state of the fuse; and
- a comparison signal generator coupled to the fuse and the sensing circuit, the comparison signal generator generating a comparison signal responsive to the state of the fuse, and wherein the sensing circuit generates the output signal responsive to the comparison signal;

wherein:
- the comparison signal generator includes a voltage divider coupled to the fuse, the voltage divider dividing a power supply signal into a first comparison signal and a second comparison signal; and
- the sensing circuit includes a comparator coupled to the voltage divider.

2. A semiconductor device according to claim 1 further including a detector circuit coupled between the fuse and the comparison signal generator.

3. A semiconductor device according to claim 1 wherein the sensing circuit generates the output signal responsive to a bias signal.

4. A semiconductor device according to claim 1 wherein the comparison signal generator generates the comparison signal responsive to a bias signal.

5. A semiconductor device according to claim 1 wherein:
- the fuse is coupled between a mode setting terminal and a first node;
- the voltage divider includes a first resistor coupled between the first node and a second node, and a second resistor coupled between the second node and a power supply terminal; and
- the comparator includes a first input terminal coupled to the first node, a second input terminal coupled to the second node, and an output terminal for generating the output signal.

6. A semiconductor device according to claim 5 wherein the voltage divider further includes a switch coupled between the first node and a second power supply terminal to energize the voltage divider responsive to a bias signal.

7. A semiconductor device according to claim 1 further including a detector circuit coupled between the fuse and the comparison signal generator.

8. A semiconductor device according to claim 7 wherein:
- the fuse is coupled between a mode setting terminal and a first node;
- the voltage divider includes a first resistor coupled between a second node and a third node, and a second resistor coupled between the third node and a first power supply terminal;
- the detector circuit includes a third resistor coupled between the first node and the second node; and
- the comparator includes a first input terminal coupled to the first node, a second input terminal coupled to the third node, and an output terminal for generating the output signal.

9. A semiconductor device according to claim 8 wherein the voltage divider further includes a switch coupled between the second node and a second power supply terminal to energize the voltage divider responsive to a bias signal.

10. A semiconductor device according to claim 1 wherein the enabling circuit includes a semiconductor switch coupled to the fuse to blow the fuse responsive to the fuse control signal.

11. A semiconductor device according to claim 1 wherein the fuse includes a zener zap diode.

12. A semiconductor device comprising:

a fuse;

means for blowing the fuse responsive to a fuse control signal;

means for generating an output signal responsive to the state of the fuse; and means for generating a comparison signal responsive to the state of the fuse;

wherein:

the means for generating a comparison signal includes a voltage divider coupled to the fuse, the voltage divider dividing a power supply signal into a first comparison signal and a second comparison signal; and the means for generating an output signal includes a comparator coupled to the voltage divider.

13. A semiconductor memory device according to claim 12 further including means for detecting the state of the fuse.

14. A semiconductor memory device according to claim 12 further including means for placing the fuse in either a normal mode or a fuse blowing mode.

15. A method of adjusting a semiconductor device after fabrication comprising:

generating a fuse control signal;

blowing a fuse responsive to the fuse control signal if the fuse control signal is asserted; and generating an output signal responsive to the state of the fuse;

wherein generating the output signal includes:

sensing the resistance of the fuse; and asserting the output signal if the resistance of the fuse exceeds a predetermined value; and wherein sensing the resistance of the fuse includes:

dividing a power supply signal responsive to the state of the fuse, thereby generating two comparison signals; and comparing the two comparison signals.

16. A semiconductor device according to claim 2 wherein the detector circuit includes a resistor.

17. A semiconductor device according to claim 7 wherein the detector circuit includes a resistor.

18. A semiconductor device according to claim 13 wherein the means for detecting the state of the fuse includes a resistor.

* * * * *